United States Patent
Griffin

(10) Patent No.: US 8,098,814 B2
(45) Date of Patent: *Jan. 17, 2012

(54) HANDHELD ELECTRONIC DEVICE WITH KEYBOARD

(75) Inventor: Jason T. Griffin, Waterloo (CA)

(73) Assignee: Research in Motion Limited, Waterloo, Ontario (CA)

( * ) Notice: Subject to any disclaimer, the term of this patent is extended or adjusted under 35 U.S.C. 154(b) by 136 days.

This patent is subject to a terminal disclaimer.

(21) Appl. No.: 12/480,995

(22) Filed: Jun. 9, 2009

(65) Prior Publication Data

US 2009/0256728 A1 Oct. 15, 2009

Related U.S. Application Data

(63) Continuation of application No. 10/872,983, filed on Jun. 21, 2004, now Pat. No. 7,561,685, which is a continuation of application No. PCT/CA02/01961, filed on Dec. 17, 2002.

(60) Provisional application No. 60/341,758, filed on Dec. 21, 2001.

(51) Int. Cl.
*H04M 1/00* (2006.01)
*H04M 9/00* (2006.01)

(52) U.S. Cl. ............ 379/433.07; 379/368; 341/22; 400/472; 400/485; 400/486; 400/489

(58) Field of Classification Search ......... 379/433.07, 379/368; 341/22; 400/472, 485, 486, 489
See application file for complete search history.

(56) References Cited

U.S. PATENT DOCUMENTS

| | | | |
|---|---|---|---|
| 5,303,288 A | 4/1994 | Duffy | |
| 5,319,582 A | 6/1994 | Ma | |
| 5,764,474 A | 6/1998 | Youens | |
| 5,801,345 A * | 9/1998 | Mikula-Curtis et al. | 200/5 A |
| 5,903,259 A | 5/1999 | Brusky et al. | |
| 5,903,289 A | 5/1999 | Takayanagi | |
| 6,480,185 B1 | 11/2002 | Kiljander et al. | |
| 6,487,396 B1 | 11/2002 | Sassi | |
| 6,525,714 B1 | 2/2003 | Varga | |
| 6,813,509 B2 | 11/2004 | Aquilar | |

(Continued)

FOREIGN PATENT DOCUMENTS

DE 19743283 C1 2/1999

(Continued)

OTHER PUBLICATIONS

User Guide Nokia 6210, 9352375 Issue 2, Jun. 9, 2009.

(Continued)

*Primary Examiner* — Quynh Nguyen
(74) *Attorney, Agent, or Firm* — Novak Druce + Quigg LLP

(57) ABSTRACT

A keyboard includes a plurality of keys each of which is associated with indicia corresponding to at least one of alphabetic characters, numbers, or commands. The keys of the plurality of keys associated with alphabetic characters number fewer than 26 and greater than nine. No more than two alphabetic characters are associated with each of the keys associated with alphabetic characters. At least one of the keys associated with alphabetic characters is associated with two alphabetic characters and at least one number. The numbers are arranged and displayed in the format of a phone keypad and the letters are arranged and displayed in a keyboard layout.

18 Claims, 5 Drawing Sheets

U.S. PATENT DOCUMENTS

| | | | |
|---|---|---|---|
| 6,959,208 | B2 | 10/2005 | Tanaka et al. |
| 7,083,342 | B2 | 8/2006 | Griffin |
| 7,133,706 | B2 | 11/2006 | Kespohl et al. |
| 7,177,604 | B2 | 2/2007 | Wong et al. |
| 7,231,229 | B1 | 6/2007 | Hawkins et al. |
| 7,511,700 | B2 | 3/2009 | Skillman |
| 7,532,198 | B2 | 5/2009 | Lazaridis |
| 2004/0165924 | A1 | 8/2004 | Griffin |
| 2005/0244208 | A1* | 11/2005 | Suess .................... 400/486 |
| 2006/0022947 | A1 | 2/2006 | Griffin |
| 2006/0270444 | A1 | 11/2006 | Miramontes |
| 2007/0254700 | A1 | 11/2007 | Griffin |
| 2007/0254701 | A1 | 11/2007 | Griffin |
| 2007/0254704 | A1 | 11/2007 | Griffin |
| 2007/0268259 | A1 | 11/2007 | Griffin |
| 2007/0281675 | A1 | 12/2007 | Pletikosa |
| 2008/0057941 | A1 | 3/2008 | Scott et al. |
| 2008/0057985 | A1 | 3/2008 | Tao |

FOREIGN PATENT DOCUMENTS

| | | | |
|---|---|---|---|
| JP | 59178531 | | 10/1984 |
| JP | 9-128148 | | 5/1997 |
| JP | 2000/35857 | | 2/2000 |
| WO | 00/35091 | A | 6/2000 |
| WO | 01/85460 | A1 | 11/2001 |

OTHER PUBLICATIONS

JP2003-557174 Office Action (Nov. 2, 2009).
EP02787264.7 Summons to Oral Proceedings (Apr. 1, 2010).
AU2009201947 Examination Report (May 14, 2010).
"Advisory Action dated Apr. 20, 2010"; In corresponding U.S. Appl. No. 11/672,016.
"Advisory Action dated Jul. 6, 2010"; In corresponding U.S. Appl. No. 11/671,961.
"Advisory Action dated Jul. 7, 2010." In corresponding U.S. Appl. No. 11/672,028.
"Advisory Action dated Apr. 7, 2010", In corresponding U.S. Appl. No. 11/671,995.
"Advisory Action dated Apr. 20, 2010"; In corresponding U.S. Appl. No. 11/672,021.
"Advisory Action dated Apr. 7, 2010", In corresponding U.S. Appl. No. 11/671,985.
"Advisory Action dated Apr. 7, 2010", In corresponding U.S. Appl. No. 11/672,032.
"Advisory Action dated Apr. 9, 2010", In corresponding U.S. Appl. No. 11/672,017.
"Advisory Action dated Feb. 23, 2010", In corresponding U.S. Appl. No. 11/671,976.
"Advisory Action dated Jul. 6, 2010", In corresponding U.S. Appl. No. 11/672,026.
"Advisory Action dated Sep. 15, 2009"; In corresponding U.S. Appl. No. 11/672,026.
"Final Office Action dated Feb. 17, 2010"; In corresponding U.S. Appl. No. 11/672,031.
"Final Office Action dated Feb. 24, 2010", In corresponding U.S. Appl. No. 11/672,023.
"Final Office Action dated Apr. 23, 2010", In corresponding U.S. Appl. No. 11/672,028.
"Final Office Action dated Dec. 10, 2009", received in corresponding U.S. Appl. No. 11/671,976.
"Final Office Action dated Feb. 1, 2010." In corresponding U.S. Appl. No. 11/672,032.
"Final Office Action dated Feb. 1, 2010.", received in corresponding U.S. Appl. No. 11/671,985.
"Final office Action dated Feb. 24, 2010", In corresponding U.S. Appl. No. 11/672,011.
"Final Office Action dated Feb. 26, 2010." In corresponding U.S. Appl. No. 11/672,024.
"Final Office Action dated Jul. 1, 2010", In corresponding U.S. Appl. No. 11/671,996.
"Final Office Action dated Apr. 15, 2010", In corresponding U.S. Appl. No. 11/671,976.
"Final Office Action dated Apr. 23, 2010", corresponding U.S. Appl. No. 11/671,961.
"Final Office Action dated Apr. 26, 2010", In corresponding U.S. Appl. No. 11/672,026.
"Final Office Action dated Aug. 13, 2009", In corresponding U.S. Appl. No. 11/672,021.
"Final Office Action dated Dec. 28, 2009", received in corresponding U.S. Appl. No. 11/671,977.
"Final Office Action dated Feb. 1, 2010", In corresponding U.S. Appl. No. 11/671,985.
"Final Office Action dated Feb. 1, 2010", In corresponding U.S. Appl. No. 11/671,995.
"Final Office Action dated Feb. 1, 2010"; In corresponding U.S. Appl. No. 11/672,017.
"Final Office Action dated Feb. 17, 2010", In corresponding U.S. Appl. No. 11/672,008.
"Final Office Action dated Feb. 26, 2010", In corresponding U.S. Appl. No. 11/372,024.
"Final Office Action dated Feb. 9, 2010"; In corresponding U.S. Appl. No. 11/672,021.
"Final Office Action dated Feb. 9, 2010", In corresponding U.S. Appl. No. 11/672,016.
"Final Office Action dated Oct. 26, 2009"; In corresponding U.S. Appl. No. 11/672,028.
"Final Office Action dated Feb. 9, 2010.", In corresponding U.S. Appl. No. Feb. 9, 2010.
"Non- Final Office Action dated Jun. 1, 2010", received in corresponding U.S. Appl. No. 11/672,017.
"Non-Final office Action dated Jun. 11, 2010", In corresponding U.S. Appl. No. 11/671,977.
"Non-Final Action dated Sep. 15, 2009." In corresponding U.S. Appl. No. 11/672,024.
"Non-final Office Action dated Aug. 7, 2009.", In corresponding U.S. Appl. No. 11/672,032.
"Non-Final Office Action dated Aug. 17, 2009", In corresponding U.S. Appl. No. 11/671,995.
"Non-Final Office Action dated Aug. 17, 2009", In corresponding U.S. Appl. No. 11/672,017.
"Non-Final Office Action dated Aug. 7, 2009", In corresponding U.S. Appl. No. 11/671,985.
"Non-Final Office Action dated May 6, 2010", In corresponding U.S. Appl. No. 11/672,031.
"Non-Final Office Action dated May 7, 2010", In corresponding U.S. Appl. No. 11/671,995.
"Non-Final Office Action dated Sep. 15, 2009." In corresponding U.S. Appl. No. 11/672,023.
"Non-Final office Action dated Sep. 24, 2009"; In corresponding U.S. Appl. No. 11/672,006.
"Non-Final Office Action dated Jul. 22, 2009", In corresponding U.S. Appl. No. 11/671,976.
"Non-Final office Action dated May 25, 2010", In corresponding U.S. Appl. No. 11/672,024.
"Non-Final Office Action dated Oct. 27, 2009.", received in corresponding U.S. Appl. No. 11/671,961.
"Non-Final Office Action dated Apr. 30, 2010", In corresponding U.S. Appl. No. 11/671,985.
"Non-Final Office Action dated Aug. 13, 2009", In corresponding U.S. Appl. No. 11/672,021.
"Non-Final Office Action dated Aug. 17, 2009", In corresponding U.S. Appl. No. 11/672,031.
"Non-Final Office Action dated Aug. 17, 2009.", received in corresponding U.S. Appl. No. 11/641,995.
"Non-Final Office Action dated Aug. 17, 2010.", In corresponding U.S. Appl. No. 11/672,031.
"Non-Final Office Action dated Aug. 18, 2009", received in corresponding U.S. Appl. No. 11/672,016.
"Non-Final Office Action dated Aug. 7, 2009", In corresponding U.S. Appl. No. 11/671,985.
"Non-Final Office Action dated Aug. 7, 2009", In corresponding U.S. Appl. No. 11/672,032.
"Non-Final Office Action dated Feb. 9, 2010.", In corresponding U.S. Appl. No. 11/672,016.

"Non-Final Office Action dated Jan. 8, 2010", In corresponding U.S. Appl. No. 11/671,996.

"Non-Final Office Action dated Jul. 20, 2009", In corresponding U.S. Appl. No. 11/671,996.

"Non-Final Office Action dated Jul. 21, 2009", In corresponding U.S. Appl. No. 11/671,977.

"Non-Final Office Action dated Jul. 21, 2009." received in corresponding U.S. Appl. No. 11/641,977.

"Non-Final Office Action dated Jul. 21, 2010", In corresponding U.S. Appl. No. 11/671,977.

"Non-Final Office Action dated Jun. 1, 2010", In corresponding U.S. Appl. No. 11/672,021.

"Non-Final Office Action dated Jun. 1, 2010", In corresponding U.S. Appl. No. 11/672,017.

"Non-Final Office Action dated Jun. 1, 2010", In corresponding U.S. Appl. No. 11/672,016.

"Non-Final Office Action dated Mar. 12, 12010", In corresponding U.S. Appl. No. 11/672,006.

"Non-Final Office Action dated May 25, 2010", In corresponding U.S. Appl. No. 11/672,011.

"Non-Final office Action dated May 25, 2010", In corresponding U.S. Appl. No. 11/672,023.

"Non-Final Office Action dated May 6, 2009", In corresponding U.S. Appl. No. 11/672,032.

"Non-Final Office Action dated May 7, 2010", In corresponding U.S. Appl. No. 11/672,008.

"Non-Final Office Action dated Oct. 23, 2009", In corresponding U.S. Appl. No. 11/672,028.

"Non-Final Office Action dated Oct. 26, 2009", received in corresponding U.S. Appl. No. 11/672,026.

"Non-Final Office Action dated Sep. 15, 2009", In corresponding U.S. Appl. No. 11/672,024.

"Non-Final Office Action dated Sep. 2, 2009", In corresponding U.S. Appl. No. 11/672,008.

"Non-Final Office Action dated Sep. 24, 2009", In corresponding U.S. Appl. No. 11/672,006.

"Non-Final Office Action dated Sep. 3, 2009", In corresponding U.S. Appl. No. 11/672,011.

"Non-Final office Action Jan. 8, 2010", In corresponding U.S. Appl. No. 11/671,996.

"Non-Final Office Action dated May 25, 2010", In corresponding U.S. Appl. No. 11/672,011.

"Advisory Action dated Apr. 7, 2010", In corresponding U.S. Appl. No. 11/672,032.

MacKenzie et al, "Text Entry for Mobile Computing: Models and Methods, Theory and Practice", Human-Computer Interaction, 2002, 147-198, vol. 17, Lawrence Erlbaum Associates, Inc.

* cited by examiner

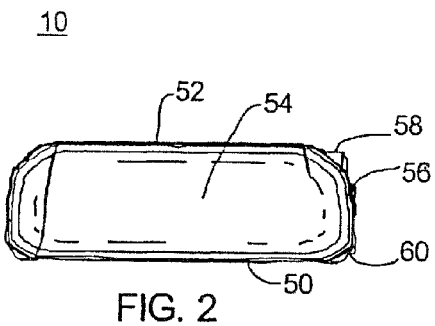
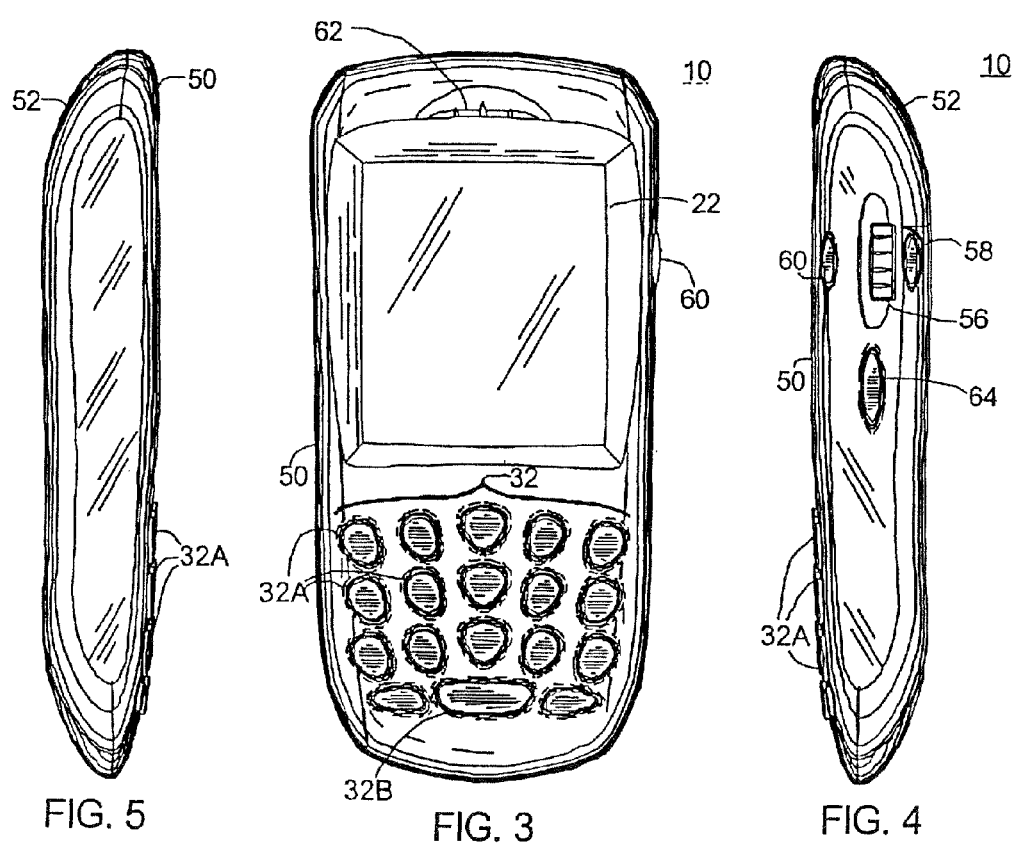
FIG. 2
FIG. 5  FIG. 3  FIG. 4

HANDHELD ELECTRONIC DEVICE WITH KEYBOARD

CROSS-REFERENCE TO RELATED APPLICATIONS

This application is a continuation of U.S. application Ser. No. 10/872,983, filed on Jun. 21, 2004, now U.S. Pat. No. 7,561,685 which is a continuation of International Application No. PCT/CA02/01961 filed Dec. 17, 2002, which claims the benefit of priority from U.S. Provisional Application Ser. No. 60/341,758, filed on Dec. 21, 2001. Said applications are expressly incorporated herein by reference in their entirety.

FIELD

This application relates generally to the field of small handheld electronic devices and especially to dual-mode handheld communication devices or mobile stations with a keyboard input. More particularly, the present application relates to textual input keyboards for use in such devices.

BACKGROUND

Existing keyboards or keypads for small handheld devices often use the standard 12-key telephone keypads (herein collectively referred to as keypads). These keypads typically have four rows of three buttons. The first three rows are typically formed from the numbers 1-9, arranged left to right, top to bottom, in increasing order. The fourth row is formed from the keys '*' '0' and '#'. Alphabetic values are ascribed to keys 2-9 in a standardized alphabetic order. Typing text using such keypads requires the user to input data in an unfamiliar manner. Other kinds of keyboards follow the Dvorak or, more commonly, the QWERTY keyboard models and are used in portable handheld devices such as the RIM 950 Wireless Handheld™. This kind of keyboard, when adapted to handheld devices, uses a plurality of small individual keys optimised for operation with the thumbs of the user. However, such a keyboard has considerably more keys than a keypad and the larger number of individual keys requires more space on a printed circuit board (PCB) than a keypad. Typically, each key requires its own footprint and switch on the PCB. Because of the relatively small size of such handheld devices, PCB space is limited and a QWERTY or Dvorak type keyboard takes up valuable real estate on the PCB.

Such a keyboard also requires a great deal of tooling in order to accommodate the large number of individual keys in the housing of a handheld device. This tooling adds to manufacturing costs. Furthermore, on a device with a QWERTY style keyboard, it is difficult to enter numerical inputs such as a telephone number. Traditionally phone numbers are entered using keypads, and having to use a QWERTY style keyboard for such inputs, where the numbers appear in a row above the letters, is considered awkward by users.

It is, therefore, desirable to reduce the number of keys necessary for a QWERTY or DVORAK type keyboard layout used with handheld devices. It is, also desirable to combine the functionality of a QWERTY style keyboard and a keypad for use in a dual-mode communication device.

SUMMARY

It is an object of the example keyboard to obviate or mitigate at least one disadvantage of existing keyboards or keypads used with small handheld electronic devices.

In a first aspect, the example keyboard provides a keyboard for a mobile device. The keyboard includes an alphabetic key, a plurality of alphanumeric keys, a command key, and a keyboard interpreter. The alphabetic key corresponds to at least one alphabetic value, and is for actuating a signal corresponding to its at least one alphabetic value. Each of the plurality of alphanumeric keys corresponds to a numeric value and at least one alphabetic value, and is for actuating a signal that corresponds to its corresponding numeric and at least one alphabetic values. The plurality of alphanumeric keys are arranged to provide the numeric layout of a telephone keypad, and in a presently preferred embodiment the full keypad, are arranged in conjunction with the alphabetic key to provide a standard keyboard layout. The command key is for actuating a signal corresponding to a command key value. The keyboard interpreter is for receiving the signals actuated by the alphabetic key, the plurality of alphanumeric keys, and the command key, and mapping the received signals to a sequence of alphanumeric, alphabetic and command values. In a presently preferred embodiment, the standard keyboard layout is a conventional QWERTY keyboard layout, and the keypad is centered within it. In an alternate embodiment, the alphabetic key, the plurality of alphanumeric keys, and the command key are provided by an electronic touch display, which is preferably a touch sensitive liquid crystal display. In another embodiment of the first aspect, the alphanumeric keys include only alphabetic values. In a further embodiment, the alphabetic key and each of the plurality of alphanumeric keys provides one input signal to the keystroke interpreter, which employs predictive text routines for mapping the received signals to a sequence of alphanumeric and command values. In another embodiment, the command key corresponds to one of a group consisting of an ALT key, a SPACEBAR key, a RETURN key, a BACKSPACE key and a SHIFT key.

A second aspect concerns a mobile device, such as a two-way pager, a data-messaging device, a personal data assistant and a cellular telephone. The mobile device has a keyboard, a microprocessor and a software application executable by the microprocessor. The keyboard has an alphabetic key corresponding to at least one alphabetic value, for actuating a signal corresponding to its at least one alphabetic value, a plurality of alphanumeric keys, each of the plurality corresponding to a numeric value, and at least one alphabetic value, each key for actuating a signal corresponding to its corresponding numeric and at least one alphabetic values, the plurality of alphanumeric keys arranged to provide the numeric layout of a telephone keypad, and arranged in conjunction with the alphabetic key to provide a standard keyboard layout, a command key, for actuating a signal corresponding to a command key value and a keyboard interpreter for receiving the signals actuated by the alphabetic key, the plurality of alphanumeric keys, and the command key, for mapping the received signals to a sequence of alphanumeric, alphabetic and command values. The microprocessor is operatively connected to the keyboard and receives from the keyboard a sequence of alphabetic, alphanumeric and command values, which are used for controlling the operation of the device. The software application provides a plurality of operational features and initiates such features upon detection of certain inputs from the keyboard. In an embodiment of the second aspect of the example mobile device, the mobile device includes a display, which is preferably a touch sensitive liquid crystal display. In one embodiment, the keyboard is displayed on the touch sensitive liquid crystal display, and the keyboard interpreter employs predictive text routines for mapping the received signals to a sequence of alphabetic, alphanumeric and command values.

The keyboard provides a keyboard with a standard layout, so that a user can input information and commands with a keyboard that is familiar, while allowing a manufacturing process that reduces the number of keys required to provide the standard keyboard layout. This allows for a reduction in the complexity of the casing, and reduces the number of dome switches required on a PCB. The use of predictive text input simplifies text input for a user, though the use of a standard 'tap method' of text entry is also foreseen.

Other aspects and features of the example keyboard and mobile device will become apparent to those ordinarily skilled in the art upon review of the following description of specific embodiments of the example keyboard and mobile device in conjunction with the accompanying figures.

BRIEF DESCRIPTION OF THE DRAWINGS

Embodiments of the example keyboard will now be described, by way of example only, with reference to the attached Figures, wherein:

FIG. 2 is a top elevation of a typical handheld device to which a keyboard in accordance with one embodiment of the example keyboard may is applied;

FIG. 3 is a front elevation of the device of FIG. 2;

FIG. 4 is a right side elevation of the device of FIG. 2;

FIG. 5 is a left side elevation of the device of FIG. 2;

DETAILED DESCRIPTION

Generally, the example keyboard provides a reduced keyboard for a mobile device, that provides the user with a standard keyboard layout on fewer keys, while maintaining the numeric layout of a standard keypad, such as a DTMF keypad. Though a presently preferred embodiment provides a complete replication of a standard keypad, various embodiments of the example keyboard provide only the numeric layout of a standard keypad and position the '*' and '#' key in other positions on the keyboard. Presently preferred embodiments provide a standard DTMF keypad, but other standard keypads such as those provided on computer keyboards are also contemplated.

By reducing the number of keys used to provide a standard keyboard, the example keyboard provides a manufacturer the ability to reduce the number of dome switches on a PCB, and the amount of tooling required to create the apertures in the front plate of the mobile device. The reduced number of keys also provides users with the ability to actuate larger keys in the same surface area of a device that would otherwise be required to provide keys for all 26 alphabetic values, 10 numeric values and at least two non-alphanumeric values. The reduced number of keys can now be used to provide fewer, and thus larger, keys. The presence of larger keys reduces the difficulty of actuating a single small key that is surrounded by other keys.

Figure 1:
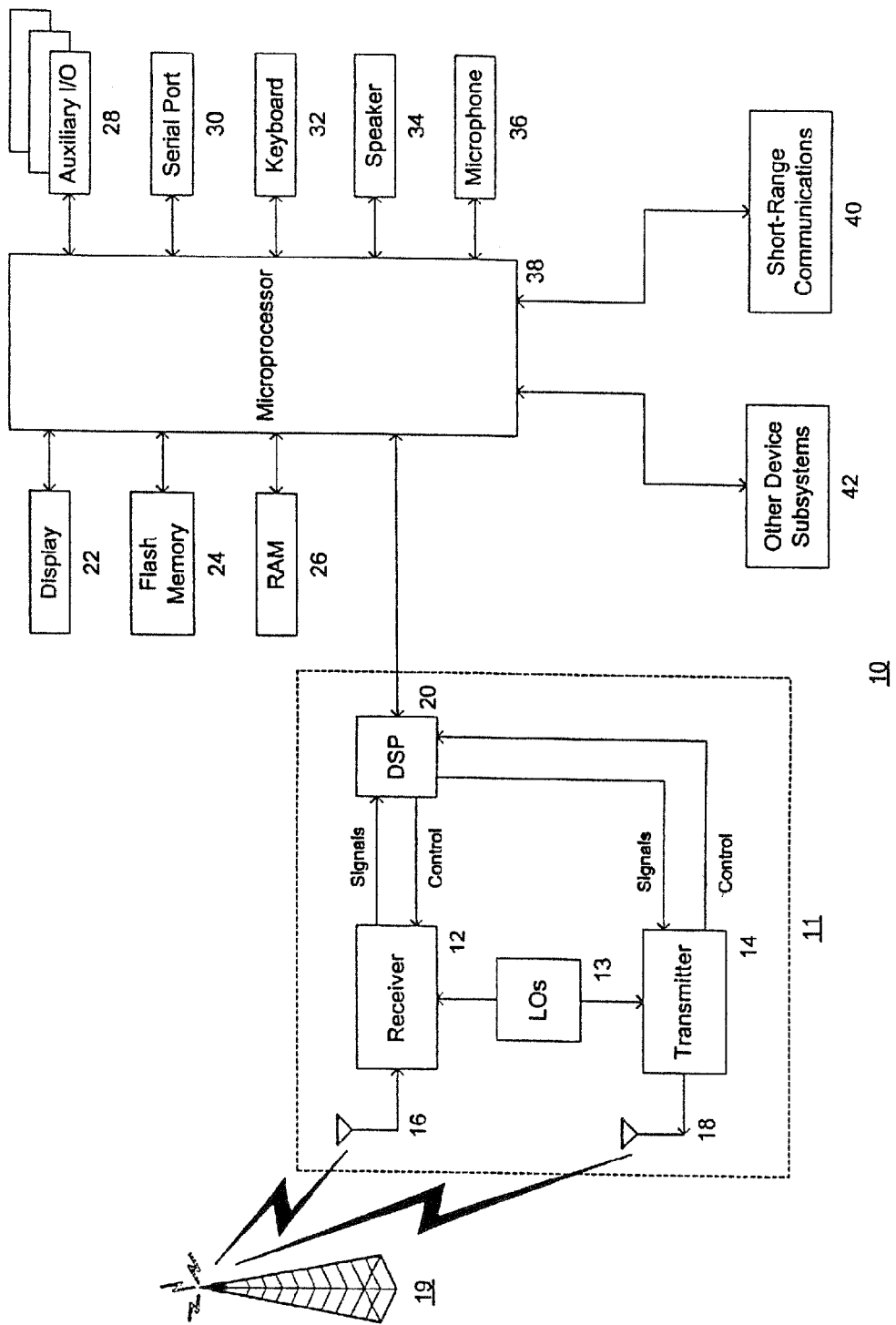
FIG. 1 is a block diagram of a mobile communication device to which the example keyboard may be applied.

Referring now to the drawings, FIG. 1 is a block diagram of a mobile communication device 10 in which the example keyboard may be implemented. The mobile communication device 10 is preferably a two-way communication device having at least voice and data communication capabilities. The device preferably has the capability to communicate with other computer systems on the Internet. Depending on the functionality provided by the device, the device may be referred to as a data messaging device, a two-way pager, a cellular telephone with data messaging capabilities, a wireless Internet appliance or a data communication device (with or without telephony capabilities).

Where the device 10 is enabled for two-way communications, the device will incorporate a communication subsystem 11, including a receiver 12, a transmitter 14, and associated components such as one or more, preferably embedded or internal, antenna elements 16 and 18, local oscillators 13, and a processing module such as a digital signal processor (DSP) 20. As will be apparent to those skilled in the field of communications, the particular design of the communication subsystem 11 will be dependent upon the communication network in which the device is intended to operate. For example, a device 10 destined for a North American market may include a communication subsystem 11 designed to operate within the Mobitex™ mobile communication system, DataTAC™ mobile communication system, or 1X CDMA based data networks, whereas a device 10 intended for use in Europe may incorporate a General Packet Radio Service (GPRS) communication subsystem 11.

Network access requirements will also vary depending upon the type of the network 19. For example, in the Mobitex and DataTAC networks, mobile devices such as device 10 are registered on the network using a unique personal identification number or PIN associated with each device. In GPRS networks however, network access is associated with a subscriber or user of a device 10. A GPRS device therefore requires a subscriber identity module (not shown), commonly referred to as a SIM card, in order to operate on a GPRS network. Without a SIM card, a GPRS device will not be fully functional. Local or non-network communication functions (if any) may be operable, but the device 10 will be unable to carry out any functions involving communications over the network 19. When required network registration or activation procedures have been completed, a device 10 may send and receive communication signals over the network 19. Signals received by the antenna 16 through a communication network 19 are input to the receiver 12, which may perform such common receiver functions as signal amplification, frequency down conversion, filtering, channel selection and the like, and in the example system shown in FIG. 1, analog to digital conversion. Analog to digital conversion of a received signal allows more complex communication functions such as demodulation and decoding to be performed in the DSP 20. In a similar manner, signals to be transmitted are processed, including modulation and encoding for example, by the DSP 20 and input to the transmitter 14 for digital to analog conversion, frequency up conversion, filtering, amplification and transmission over the communication network 19 via the antenna 18.

The DSP 20 not only processes communication signals, but also provides for receiver and transmitter control. For example, the gains applied to communication signals in the receiver 12 and transmitter 14 may be adaptively controlled through automatic gain control algorithms implemented in the DSP 20.

The device 10 preferably includes a microprocessor 38 that controls the overall operation of the device. Communication functions, preferably including at least data and voice communications, are performed through the communication subsystem 11. The microprocessor 38 also interacts with further device subsystems such as the display 22, flash memory 24, random access memory (RAM) 26, auxiliary input/output (I/O) subsystems 28, serial port 30, keyboard 32, speaker 34, microphone 36, a short-range communications subsystem 40 and any other device subsystems generally designated as 42.

Some of the subsystems shown in FIG. 1 perform communication-related functions, whereas other subsystems may provide "resident" or on-device functions. Notably, some subsystems, such as keyboard 32 and display 22 for example, may be used for both communication-related functions, such as entering a text message for transmission over a communication network, and device-resident functions such as a calculator or task list.

Operating system software used by the microprocessor 38 is preferably stored in a persistent store such as flash memory 24, which may instead be a read only memory (ROM) or similar storage element (not shown). Those skilled in the art will appreciate that the operating system, specific device applications, or parts thereof, may be temporarily loaded into a volatile store such as RAM 26. It is contemplated that received communication signals may also be stored to RAM 26.

The microprocessor 38, in addition to its operating system functions, preferably enables execution of software applications on the device. A predetermined set of applications which control basic device operations, including data and voice communication applications for example, will normally be installed on the device 10 during manufacture. A preferred application that may be loaded onto the device may be a personal information manager (PIM) application having the ability to organize and manage data items relating to the device user such as, but not limited to e-mail, calendar events, voice mails, appointments, and task items. Naturally, one or more memory stores would be available on the device to facilitate storage of PIM data items on the device. Such PIM application would preferably have the ability to send and receive data items, via the wireless network. In a preferred embodiment, the PIM data items are seamlessly integrated, synchronized and updated, via the wireless network, with the device user's corresponding data items stored or associated with a host computer system thereby creating a mirrored host computer on the mobile device with respect to the data items at least. This would be especially advantageous in the case where the host computer system is the mobile device user's office computer system. Further applications may also be loaded onto the device 10 through the network 19, an auxiliary I/O subsystem 28, serial port 30, short-range communications subsystem 40 or any other suitable subsystem 42, and installed by a user in the RAM 26 or preferably a non-volatile store (not shown) for execution by the microprocessor 38. Such flexibility in application installation increases the functionality of the device and may provide enhanced on-device functions, communication-related functions, or both. For example, secure communication applications may enable electronic commerce functions and other such financial transactions to be performed using the device 10.

In a data communication mode, a received signal such as a text message or web page download will be processed by the communication subsystem 11 and input to the microprocessor 38, which will preferably further process the received signal for output to the display 22, or alternatively to an auxiliary I/O device 28. A user of device 10 may also compose data items such as email messages for example, using the keyboard 32, which is preferably a complete alphanumeric keyboard or telephone-type keypad, in conjunction with the display 22 and possibly an auxiliary I/O device 28. Such composed items may then be transmitted over a communication network through the communication subsystem 11.

For voice communications, overall operation of the device 10 is substantially similar, except that received signals would preferably be output to a speaker 34 and signals for transmission would be generated by a microphone 36. Alternative voice or audio I/O subsystems such as a voice message recording subsystem may also be implemented on the device 10. Although voice or audio signal output is preferably accomplished primarily through the speaker 34, the display 22 may also be used to provide an indication of the identity of a calling party, the duration of a voice call, or other voice call related information for example.

The serial port 30 in FIG. 1 would normally be implemented in a personal digital assistant (PDA)-type communication device for which synchronization with a user's desktop computer (not shown) may be desirable, but is an optional device component. Such a port 30 would enable a user to set preferences through an external device or software application and would extend the capabilities of the device by providing for information or software downloads to the device 10 other than through a wireless communication network. The alternate download path may for example be used to load an encryption key onto the device through a direct and thus reliable and trusted connection to thereby enable secure device communication.

A short-range communications subsystem 40 is a further optional component which may provide for communication between the device 24 and different systems or devices, which need not necessarily be similar devices. For example, the subsystem 40 may include an infrared device and associated circuits and components or a Bluetooth™ communication module to provide for communication with similarly enabled systems and devices.

Thus, it will be apparent that handheld devices of this type perform a wide variety of complex functions and it is a challenge to provide a keyboard which is sufficiently compact to match the form factor of the handheld device but which provides the necessary level of functionality required by the user FIG. 2 is a top view of the device, which shows the device housing in two pieces: a front housing 50, and a back housing 52. This view also shows the location of an optional infrared device 54. On the right side of the device 10, there is a plurality of auxiliary input devices, including a thumbwheel 56.

FIG. 3 is a front view of the device. The front housing 50 has several openings to incorporate a plurality of input and output devices. A speaker 62, display 22, keyboard 32 and microphone (not shown) are preferably mounted within the front surface 50 of the device housing. Preferably, the speaker is positioned above the display 22 near the top of the front housing 50, and approximately in the horizontal middle of the front surface 50. The speaker 62 is positioned above the display 22. Below the speaker 62, the display 22 is mounted centrally in the front surface 50. Although a rectangular display 22 is shown in FIG. 3, other geometrical configurations of the display may also be utilized. The cursor key 60 is preferably located in close proximity to the display.

The keyboard 32 and microphone are preferably mounted in the front housing 50 below the display 22, although alternatively, the microphone may be positioned between the display 22 and the keyboard 32. The keyboard 32 is preferably positioned centrally in the front surface 50, in like manner to the display 22.

The keyboard 32 comprises a plurality of letter and alphanumeric keys 32A forming, in one embodiment, a QWERTY style layout as described in more detail below. In addition to these letter and alphanumeric keys 32A, the keyboard also includes function keys and an optional spacebar key 32B. The functions associated with these keys are determined by the layout of the inputs. Alternative layouts according to specific embodiments of the example keyboard are illustrated in further figures.

FIG. 4 is a right side view of a device according to an embodiment of the example keyboard having a plurality of inputs. These inputs may include a thumbwheel 56, cursor keys 58, 60 and an escape key 64. Other inputs will be apparent to those skilled in the art. Although FIG. 4 shows a layout of these input devices where the thumbwheel 56 is preferably between the two cursor keys 58, 60 and the escape key 64 is below the thumbwheel 56, alternative layouts may also be used.

FIG. 5 is a left side view of the device. No input devices are shown on this side of the device in the presently illustrated embodiment, though alternate embodiments may locate input devices on this side. In one envisaged embodiment, the inputs illustrated in FIG. 4, are relocated to the left side of the device to create a left hand oriented device. Other alternate embodiments where inputs are split between the two sides, or redundant inputs are provided, will be understood by those skilled in the art.

The keyboard arrangement as illustrated in the FIGS. 6-12 is designed to minimize the number of keys required to form a keyboard. The keyboard is comprised of both alphabetic keys, which are keys having only alphabetic values, and alphanumeric keys which correspond to keys having at least one alphabetic value, and a numeric value. The keys are placed so that the alphabetic values of the alphabetic and alphanumeric keys are arranged as they would be in a standard keyboard layout. The keys are also arranged so that the numeric values of the alphanumeric keys correspond to the layout of a standard telephone keypad. In addition to alphabetic and alphanumeric keys, there is at least one command key which allows the user to toggle between keyboard entry modes, so that the user can easily enter only alphabetic values, or only numeric values. In certain embodiments other command keys are present such as a "spacebar" key, and these keys may be shared by a numeric value such as zero. The following embodiments illustrate QWERTY key layouts, though other standard configurations, such as Dvorak keyboards, are contemplated. Reference to a standard keyboard, or a standard keyboard layout should be understood to refer to QWERTY, Dvorak, and other known keyboard configurations.

Because many of the keys correspond to a plurality of alphabetic or numeric values, the number of keys required to create a standard keyboard layout is reduced. This allows for a savings as fewer buttons need to be attached to the PCB. Additionally, a reduced number of dome switches are necessary to allow the keys to operate in conjunction with the PCB. A reduction in the number of keys used to form the keyboard allows for a corresponding reduction in the tooling required to make the front housing 50 which once again lowers the cost of production, and complexity of design. This benefits handheld device manufacturers since handheld devices are becoming progressively smaller in size.

Figure 6:
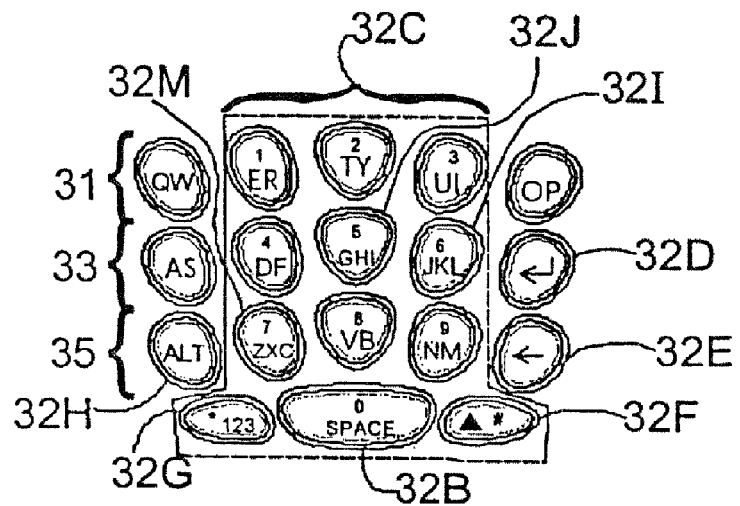
FIG. 6 is a keyboard layout according to one embodiment of the example keyboard.

FIG. 6 shows one possible layout for the alphanumeric inputs on the keys 32A of the keyboard. Although the embodiment shown in FIG. 6 includes keys representing up to four different inputs, each key may represent more or fewer inputs. The example keyboard is in no way limited to the specific character assignments in FIG. 6.

The keyboard of FIG. 6 illustrates a first embodiment of the key layout of the example keyboard. A central section of keys surrounded by dashed line 32C forms the standard telephone keypad with numbers 1 through 0, an asterisk and a pound symbol. The keys corresponding to numeric values 1 through 9 are alphanumeric keys in that they have both numerals and letters as their possible values. In this embodiment, an alphabetic key, that is a key with only alphabetic values, is placed beside the top row of keys on either side of the alphanumeric keypad. This allows two letters to be assigned to each of the keys in the top row to form the top row of a standard QWERTY keyboard. The second row of the keypad is augmented on the left side by an alphabetic key, and on the right side by a command key, which in this case refers to a key with non-alphabetic or numeric values. The command key on the right side of the central row corresponds to an 'ENTER' or 'RETURN' value. The bottom row of keys in the keypad is surrounded on both sides by command keys, one corresponding to 'ALT' and the other corresponding to BACKSPACE. The asterisk, zero and pound symbols of the keypad are all on the bottom row as is common in keypad design. The zero key is shared with a key value corresponding to the spacebar, while the asterisk in conjunction with the 'ALT' key can be used as a numeric or alphabetic lock. The pound symbol can be used in conjunction with the alt key to effect a 'SHIFT' or 'caps lock' value. Thus the embodiment of FIG. 6 assigns either two or three alphabetic values to all alphabetic and alphanumeric keys This embodiment of the layout has three rows of five keys, 31, 33 and 35 and has a space bar key 32B and two function keys 32F and 32G below the three rows. In the first row 31, the middle three keys have alphanumeric inputs and the end keys have letter inputs. Each key in the first row 31 is associated with at least two letter characters. In the second row 33, the middle three keys have alphanumeric inputs. The left-most key has letter inputs. The last key 32D has an ENTER or RETURN input. Because of this input, the two left-most keys in this row 33 are each associated with two letter characters, while keys 32I and 32J are each associated with 3 letter characters. For example, in this layout, the key 32J is associated with the characters 'G', 'H', and 'I' and the key 32I is associated with the characters 'J', 'K', and 'L'.

In the third row 35, the middle three keys have alphanumeric inputs. The left-most key 32H acts as an ALT key to access special characters that may be associated with each key 32A. When any of the alphanumeric keys are depressed in conjunction with the ALT key 32H, the user is able to access special characters or symbols (not shown).

The right-most key 32E in the third row 35 preferably acts as a BACKSPACE key. When this key 32E is depressed, any text input that was made immediately prior to the depression of key 32E is deleted.

In the third row 35, the middle three keys are alphanumeric and in this example, the key 32M is associated with three letter inputs—namely, 'Z', 'X', and 'C'.

The SPACE key 32B is centrally located below the third row 35 On either side of the SPACE key, there are function keys 32G and 32H. In this example, the right function key 32F (labelled) is preferably used as a CAPS key to create uppercase letter inputs. When the function key 32F is depressed, any letter key that is subsequently depressed will be inputted as an upper case letter.

The left function key 32G, (labelled '123') is preferably used as a NUMERAL key to access numeral inputs that are labelled within the dotted lines 32C. The numerical inputs of the keys that are within the dotted lines 32C form a typical DTMF keypad. Having these keys form a typical DTMF keypad makes it easier for users to enter such numerical sequences as a telephone number. It would be much more difficult for users to input telephone numbers if the numerical inputs were laid out in the manner of a QWERTY keyboard.

Whenever the '123' function key 32G is depressed, the numeric inputs that are labelled above the letter characters on these keys within the dotted lines 32C are inputted whenever one of these keys is subsequently depressed.

Figure 7:
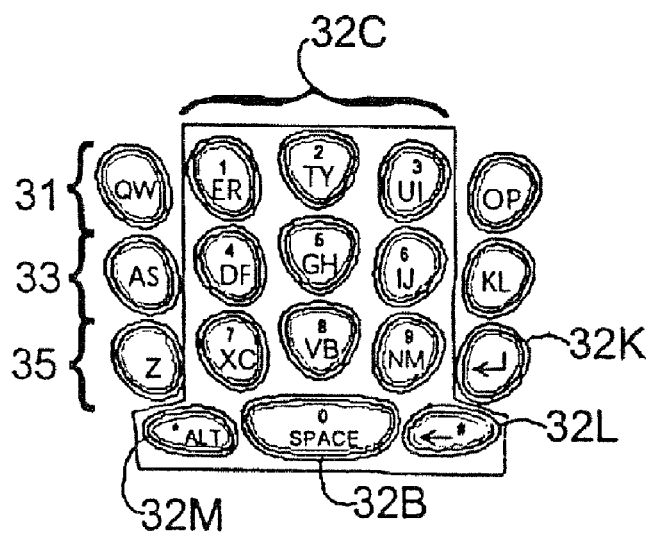
FIG. 7 is a keyboard layout according to a further embodiment of the example keyboard.

FIG. 7 illustrates a second embodiment of the example keyboard. As can be seen from FIG. 7, the keypad arrangement provides a standard numeric keypad for a telephone set. The alphabetic values assigned to each of the alphanumeric keys are arranged that such that only two alphabetic values are assigned to each key, whereas the embodiment of FIG. 6 had allowed for three alphabetic values to be assigned to certain alphanumeric keys. In the embodiment to FIG. 7, the command key corresponding with 'ENTER' has been moved to the second from the bottom row, and the 'SHIFT' value of the pound key has been replaced with a 'BACKSPACE' function. The 'ALT' value now is co-located with the asterisk key. Thus the embodiment of FIG. 7 provides a keyboard layout where no more than two alphabetic values are assigned to each alphabetic or alphanumeric key.

In the embodiment of FIG. 7, each key 32A is associated with at most two letter characters. The RETURN key 32K may be located on the right-most key of the third row 35. The BACKSPACE key 32L is the right-most function key beside the SPACE key 32B, which is located below the third row 35. The ALT key 32M is the left-most function key beside the SPACE key 32B. Unlike the layout in FIG. 6, the keyboard layout in FIG. 7 requires extra keys outside of the keyboard in order to access the numerical inputs within the dotted lines 32C and to access upper-case letter inputs.

Figure 8:
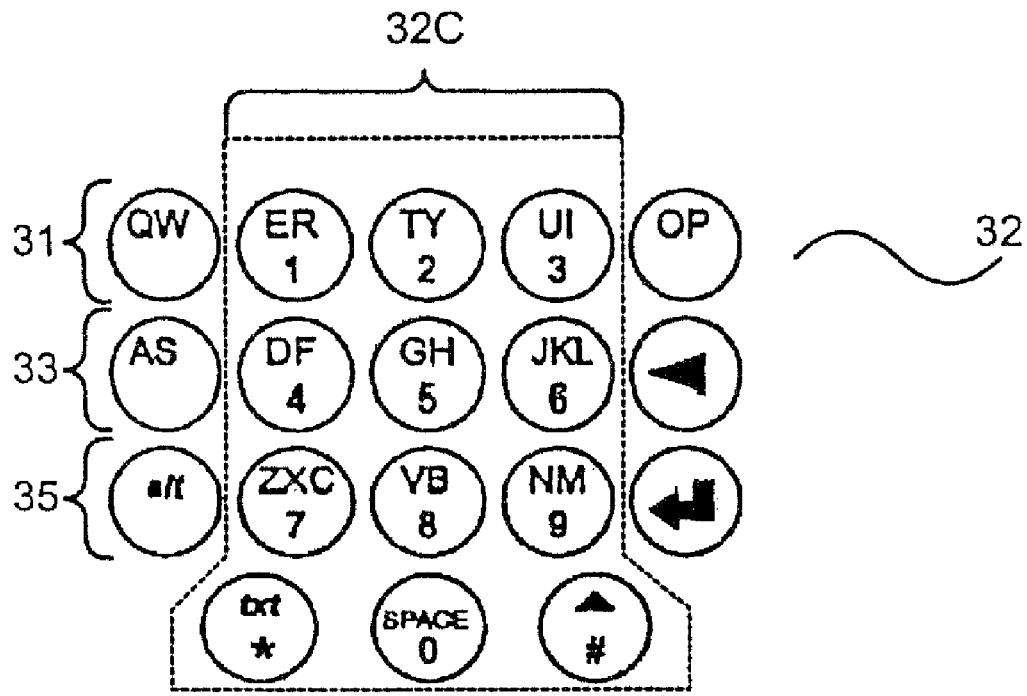
FIG. 8 is a keyboard layout according to an alternate embodiment of the example keyboard.
Figure 9:
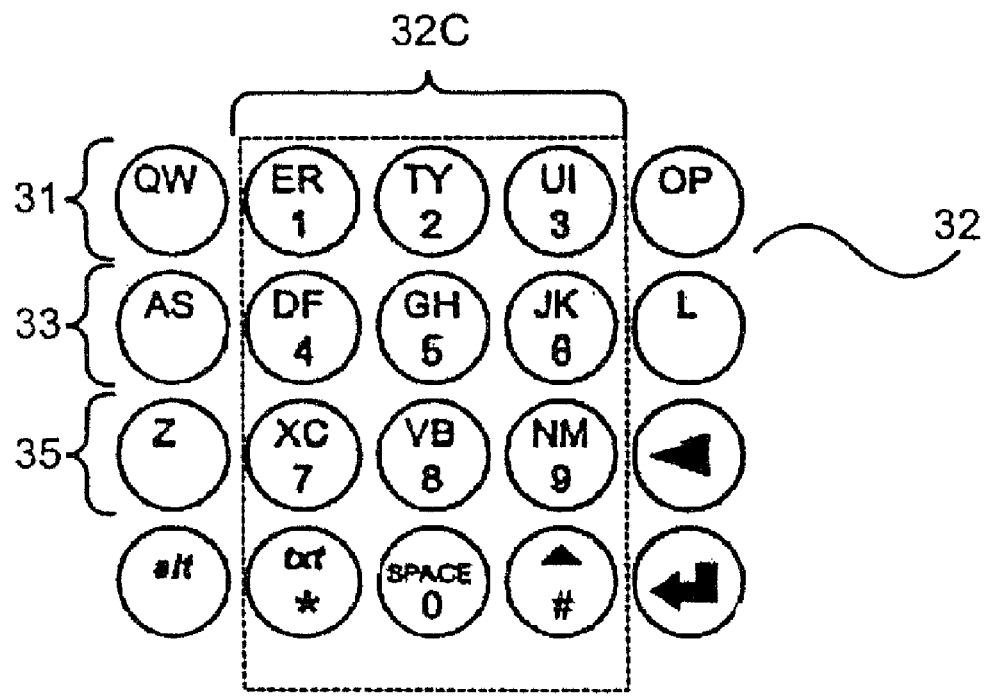
FIG. 9 is a keyboard layout according to another alternate embodiment of the example keyboard.
Figure 10:
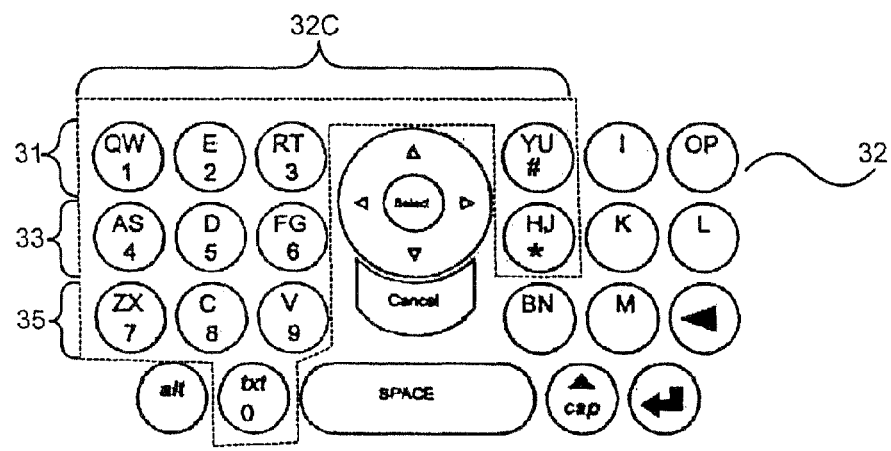
FIG. 10 is a keyboard layout according to another alternate embodiment of the example keyboard.

FIGS. 8, 9, 10, 11 and 12 provide further embodiments of the keyboard/keypad of the example keyboard. As can be seen from these Figures, alphanumeric keys have one numeric, and at least one alphabetic value. In addition, alphabetic keys exist which have only alphabetic values. These keys can have one, or a plurality of values. Command values can be located on either command keys, or they can be co-located with either alphabetic, or numeric keys. In each embodiment, each key can be categorized as an alphabetic, alphanumeric or command key. In the embodiment of FIG. 10, the numeric values of the keypad are located on the left side of the key configuration, whereas the pound and asterisk keys are located on the right side. Additionally, a directional keypad with additional command functions is present. One skilled in the art will readily appreciate that the directional keypad could be replaced with either a set of directional keys, or a joy stick type device.

FIG. 8 illustrates an embodiment of the example keyboard wherein the standard DTMF keypad layout 32C is reproduced in the center of keyboard 32. Rows 31, 33 and 35 provide the three rows of a standard QWERTY keyboard. The '*' key, in conjunction with the 'ALT' key found at the left of row 35, is used to change between alphabetic and numeric modes. When in alphabetic mode, the '#' key serves as either a 'SHIFT' or a 'CAPS LOCK' value, so that capital letters can be entered. The '0' key, when in the alphabetic mode, serves as the 'SPACE BAR'. The 'BACKSPACE' and 'ENTER' keys are provided as the rightmost keys in rows 33 and 35 respectively.

FIG. 9 illustrates an embodiment of the example keyboard wherein the standard DTMF keypad layout 32C is reproduced in the center of keyboard 32. Rows 31, 33 and 35 provide the three rows of a standard QWERTY keyboard. The '*' key, in conjunction with the 'ALT' key found below the leftmost key in row 35 is used to change between alphabetic and numeric modes. When in alphabetic mode, the '#' key serves as either a 'SHIFT' or a 'CAPS LOCK' value, so that capital letters can be entered. This layout provides a keyboard configuration where no more than two alphabetic values are assigned to a single key. The '0' key, when in the alphabetic mode, serves as the 'SPACE BAR'. The 'BACKSPACE' key is provided as the rightmost key in row 35, and the 'ENTER' key is provided below 'BACKSPACE' key.

FIGS. 8 and 9 differ from the layout presented in FIGS. 6 and 7 in the positioning of the 'BACKSPACE' and 'ENTER' keys.

FIG. 10 illustrates an embodiment of the example keyboard, wherein the standard DTMF keypad 32C is provided over half of the standard keypad. Nine numeric values, are provided across the first three columns of rows 31, 33 and 35. The '0' key is located below row 35 in a position that is relatively centered with respect to the DTMF keypad. The '*' and '#' keys are provided in a second half of the keyboard, so that only the DTMF keypad layout of numeric keys is fully provided. This layout provides a larger keyboard configuration, and a separate 'SPACEBAR', while still reducing the number of keys required to provide a full standard keyboard.

Figure 11:
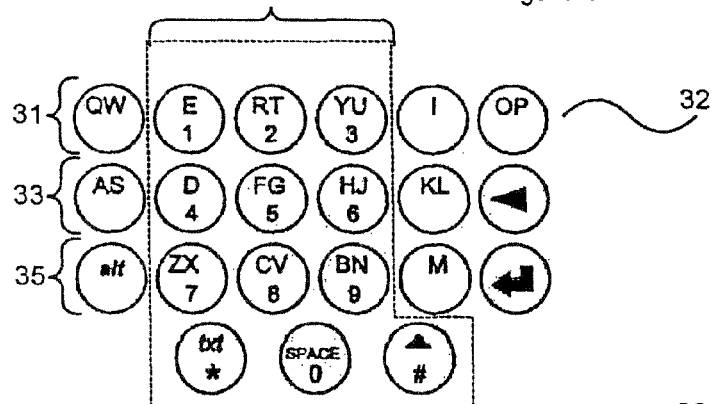
FIG. 11 is a keyboard layout according to a further embodiment of the example keyboard.

FIG. 11 illustrates an embodiment of the example keyboard wherein the standard DTMF keypad layout 32C is reproduced relatively centered in keyboard 32. Rows 31, 33 and 35 provide the three rows of a standard QWERTY keyboard. The '*' key, in conjunction with the 'ALT' key which is the leftmost key in row 35, is used to change between alphabetic and numeric modes. When in alphabetic mode, the '#' key serves as either a 'SHIFT' or a 'CAPS LOCK' value, so that capital letters can be entered. This layout provides a keyboard configuration where no more than two alphabetic values are assigned to a single key. The '0' key, when in the alphabetic mode, serves as the 'SPACE BAR'. The 'BACKSPACE' and 'ENTER' keys are provided as the rightmost keys in rows 33 and 35 respectively.

Figure 12:
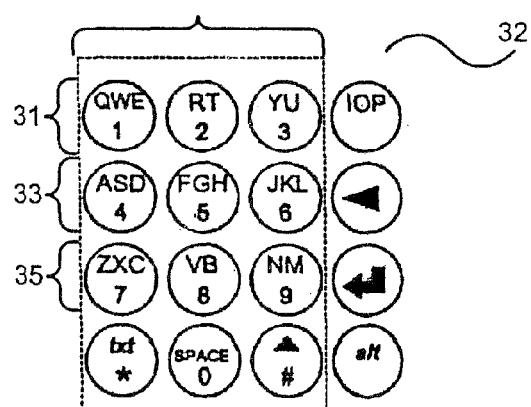
FIG. 12 is a keyboard layout according to a further alternate embodiment of the example keyboard.

FIG. 12 illustrates an embodiment of the example keyboard wherein a standard keyboard layout 32 is provided using four columns. The DTMF keypad layout 32C is provided as the three leftmost columns in the keyboard, though one of skill in the art will readily appreciate that the DTMF keypad could be represented by the three rightmost columns as well. The three rows of a standard keyboard are provided in rows 31, 33, and 35. The '*' key, in conjunction with the 'ALT' key found below the rightmost key in row 35 is used to change between alphabetic and numeric modes. When in alphabetic mode, the '#' key serves as either a 'SHIFT' or a 'CAPS LOCK' value, so that capital letters can be entered. The '0' key, when in the alphabetic mode, serves as the 'SPACE BAR'. The '0' key, when in the alphabetic mode, serves as the 'SPACE BAR'. The 'BACKSPACE' and 'ENTER' keys are provided as the rightmost keys in rows 33 and 35 respectively.

One skilled in the art will readily appreciate that when mounted on a PCB, each key activates a dome switch, or other similar device known to those skilled in the art. When depressed, the key actuates a signal, by depressing the dome switch and allowing current to flow to a keyboard interpreter, which receives the signal from the dome switch. The keyboard interpreter can determine which key was depressed based on the received signal.

In use, the example keyboard provides the user with a standard keyboard layout such as a QWERTY or Dvorak keyboard configuration. This allows the user to avoid the "hunt-and-peck" experience of using a standard telephone keypad where the alphabetic values assigned to each key are provided in a purely alphabetic fashion. When a key is depressed it actuates a signal corresponding to its assigned alphabetic and numeric values where appropriate. For keys with multiple alphabetic values, a key stroke interpreter, in the keyboard interpreter, is employed to determine the intended alphabetic value corresponding to each key. The keyboard interpreter can either use predictive text input, or what is referred to in the art as a "tap method". In a tap method, a key is depressed once to provide the first alphabetic value assigned to that key, the key is depressed twice to indicate that the second alphabetic value assigned to that key is desired, and so on. Thus a user may be required to hit a key multiple times to obtain the desired character. Using predictive text input, the keystroke interpreter obtains a string of key strokes matching the obtained string against a database of strings, which correspond to words. Common predictive text input algorithms are known under trade-names of Tegic T9™ and Motorola's iTAP™. One skilled in the art will readily appreciate the use of predictive text input with this keypad arrangement.

It is contemplated that the predictive text application may be activated after a certain number of keystrokes have been made, so that the root of a word can be identified, and the full word predicted. The initial characters in the minimum length root term may be manually selected, for example by depressing a key multiple times, by holding a key in a depressed position, or by operating a further key or input while holding a key in a depressed position.

It is further contemplated that the keypad may be provided on an electronic touch screen, such as an LCD display, and that the toggling between alphabetic and numeric inputs through a command input, will remove either the alphabetic values or the numeric values associated with the keys from the display so that the user will recognise which entry mode is being used. In a further contemplated embodiment, the alphanumeric keys are provided with only alphabetic values, so that a keyboard implementation is provided that requires fewer keys, while maintaining a standard keyboard layout. In this configuration, a set of purely numeric keys is typically paired with the keyboard layout to provide a keypad for entry of telephone numbers.

As illustrated in the numerous embodiments, the scope of the example keyboard is not restricted to a particular arrangement of alphabetic, and alphanumeric keys as a simple redeployment of said keys which would fall well within the scope of the example keyboard could be performed by one skilled in the art after having read these teachings. Thus the example keyboard provides a keypad/keyboard configuration with a reduced number of keys which allows for reduced tooling and machining, reduced space on the PCB, and allows the user faster input of data.

The above-described embodiments of the present invention are intended to be examples only. Alterations, modifications and variations may be effected to the particular embodiments by those of skill in the art without departing from the scope of the invention, which is defined solely by the claims appended hereto.

I claim:

1. An electronic device comprising:
a touch screen;
a processor communicatively coupled to the touch screen and configured to execute instructions to:
   display, on the touch screen, a plurality of keys having at least one of alphabetic characters or numbers associated therewith;
   the plurality of keys having alphabetic characters number fewer than twenty-six and greater than nine, and no more than two alphabetic characters are associated with each key having alphabetic characters;
   at least one of the keys having two alphabetic characters and at least one number;
   the numbers are arranged and displayed in the format of a phone keypad and the letters are arranged and displayed in a keyboard layout, wherein the phone keypad is associated with keys in a first row, a second row, a third row, and a fourth row, with keys in the first row including a number "1", a number "2", and a number "3", with keys in the second row including a number "4", a number "5", and a number "6", with keys in the third row including a number "7", a number "8", and a number "9", with at least one key in the fourth row including a number "0",
   receive a single detected touch from the touch screen, the single detected touch corresponding to one of the plurality of keys;
   determine which alphabetic character or number should be selected based upon a predictive text application;
   display the determined alphabetic character or number on the touch screen; and
   wherein the plurality of keys displayed on the touch screen include one or more keys associated with command indicia chosen from a group comprising alt, spacebar, return, backspace, and shift.

2. The electronic device as recited in claim 1, wherein the plurality of keys are arranged in at least five columns comprising in order a first, second, third, fourth, and fifth column.

3. The electronic device as recited in claim 2, wherein the keys associated with the numbers "1", "4", and "7" are in the first column, the keys associated with the numbers "2", "5", "8", and "0" are in the second column, and the keys associated with the numbers "3", "6", and "9" are in the third column.

4. The electronic device as recited in claim 2, wherein the keys associated with the numbers "1", "4", and "7" are in the second column, the keys associated with the numbers "2", "5", "8", and "0" are in the third column, and the keys associated with the numbers "3", "6", and "9" are in the fourth column.

5. The electronic device as recited in claim 1, further comprising a key associated with "*" to the left and adjacent the key associated with the number "0" and a key associated with "#" to the right and adjacent the key associated with the number "0".

6. The electronic device as recited in claim 1, wherein the keyboard layout comprises one of QWERTY, QWERTZ, AZERTY, or DVORAK.

7. The electronic device as recited in claim 1, wherein one of the plurality of keys is associated with both a "space" command indicia and the number "0".

8. The electronic device as recited in claim 1, wherein a spacebar key is centered substantially horizontally in a fourth row.

9. A non-transitory medium configured to store instructions for execution by a processor of the electronic device, the non-transitory medium includes instructions to:
- display, on the touch screen, a plurality of keys having at least one of alphabetic characters or numbers associated therewith;
  - the plurality of keys having alphabetic characters number fewer than twenty-six and greater than nine, and no more than two alphabetic characters are associated with each key having alphabetic characters;
- at least one of the keys having two alphabetic characters and at least one number;
- the numbers are arranged and displayed in the format of a phone keypad and the letters are arranged and displayed in a keyboard layout, wherein the phone keypad is associated with keys in a first row, a second row, a third row, and a fourth row, with keys in the first row including a number "1", a number "2", and a number "3", with keys in the second row including a number "4", a number "5", and a number "6", with keys in the third row including a number "7", a number "8", and a number "9", with at least one key in the fourth row including a number "0",
- receive a single detected touch from the touch screen, the single detected touch corresponding to one of the plurality of keys;
- determine which alphabetic character or number should be selected based upon a predictive text application;
- display the determined alphabetic character or number on the touch screen; and
- display a plurality of keys associated with command indicia, wherein at least some of the keys associated with command indicia have indicia chosen from a group comprising alt, spacebar, return, backspace, and shift.

10. The non-transitory medium as recited in claim 9, wherein the plurality of keys are arranged in at least five columns comprising in order a first, second, third, fourth, and fifth column.

11. The non-transitory medium as recited in claim 10, wherein the keys associated with the numbers "1", "4", and "7" are in the first column, the keys associated with the numbers "2", "5", "8", and "0" are in the second column, and the keys associated with the numbers "3", "6", and "9" are in the third column.

12. The non-transitory medium as recited in claim 10, wherein the keys associated with the numbers "1", "4", and "7" are in the second column, the keys associated with the numbers "2", "5", "8", and "0" are in the third column, and the keys associated with the numbers "3", "6", and "9" are in the fourth column.

13. The non-transitory medium as recited in claim 9, further comprising a key associated with "*" to the left and adjacent the key associated with the number "0" and a key associated with "#" to the right and adjacent the key associated with the number "0".

14. The non-transitory medium as recited in claim 9, wherein the keyboard layout comprises one of QWERTY, QWERTZ, AZERTY, or DVORAK.

15. The non-transitory medium as recited in claim 9, wherein one of the plurality of keys is associated with both a "space" command indicia and the number "0".

16. The non-transitory medium as recited in claim 9, wherein a spacebar key is centered substantially horizontally in a fourth row.

17. The electronic device as recited in claim 1, further comprising an auxiliary input device.

18. The electronic device as recited in claim 17, wherein the auxiliary input device is a thumbwheel.

* * * * *